United States Patent
Williams et al.

(10) Patent No.: US 7,420,737 B2
(45) Date of Patent: Sep. 2, 2008

(54) RECONFIGURABLE ZONE PLATE LENS

(75) Inventors: David Williams, San Jose, CA (US);
James P. Kardach, Saratoga, CA (US);
Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 11/314,602

(22) Filed: Dec. 21, 2005

(65) Prior Publication Data
US 2007/0139777 A1    Jun. 21, 2007

(51) Int. Cl.
G02B 5/18     (2006.01)
G02B 27/44    (2006.01)
G02F 1/13     (2006.01)

(52) U.S. Cl. .................... 359/573; 359/565; 349/201

(58) Field of Classification Search .............. 359/15, 359/565, 566, 573, 742; 349/201
See application file for complete search history.

(56) References Cited

U.S. PATENT DOCUMENTS

| | | | | |
|---|---|---|---|---|
| 3,861,784 A | * | 1/1975 | Torok | 359/573 |
| 5,151,814 A | * | 9/1992 | Grinberg et al. | 359/209 |
| 5,794,023 A | * | 8/1998 | Hobbs et al. | 359/565 |
| 6,903,872 B2 | * | 6/2005 | Schrader | 359/572 |
| 7,286,292 B2 | * | 10/2007 | Sagberg et al. | 359/573 |
| 2003/0164922 A1 | * | 9/2003 | Robins et al. | 349/201 |

* cited by examiner

*Primary Examiner*—Alessandro Amari
(74) *Attorney, Agent, or Firm*—Schubert Osterrieder & Nickelson PLLC; James L. Nickelson

(57) ABSTRACT

A reconfigurable zone plate lens is disclosed. Some embodiments may include a central annular element having a first a first circumference centered about a central axis. Embodiments may also include a plurality of concentric annular elements of increasing circumference centered about the central axis and the central annular element, where each annular element is positioned around an annular element having a smaller circumference. The annular elements of some embodiments may each be adapted to be in either an active or inactive state where the active and inactive annular elements form a plurality of alternating active rings and inactive rings. Each active ring may include one or more annular elements in an active state and each inactive ring may include one or more annular elements in an inactive state. Each annular element may include one or more liquid crystal display (LCD) elements or micromirrors. Other embodiments are disclosed and claimed.

9 Claims, 8 Drawing Sheets

RECONFIGURABLE ZONE PLATE LENS

FIELD

The present invention is in the field of lenses. More particularly, the present invention relates to a reconfigurable zone plate lens to provide variable focus.

BACKGROUND

Cameras, including both video and still cameras, have become more and more ubiquitous to meet increasing demands for recording images for varied purposes such as surveillance, generating business records, or for pleasure. As cameras are used for additional and more varied purposes, there is increased need for cameras that are less expensive, physically smaller, or have improved functionality. The lens of the camera is often one of the most expensive and integral parts of the entire camera, making reductions in its cost or size impact the cost and size of the camera as a whole. Lower-cost or reduced size cameras may be particularly suitable for applications like webcams, mobile phones, or other consumer devices where the desire to reduce costs and size is intensified. Similarly, projectors also utilize lenses to assist in projecting an image on a screen or other surface. As business presentations and other projector uses continue to increase, the need for lower cost or smaller projection lenses (and projectors) also increases.

Inexpensive lenses used in cameras and projectors typically have fixed focus in order to reduce costs, limiting their usability. More expensive cameras such as digital single-lens-reflex (DSLR) camera may have variable focus lenses and sophisticated autofocus systems that move the optical lens or lens elements to achieve proper focus. While variable focus lenses provide a valuable addition to the functionality of lenses, they may have significant drawbacks. Besides the expense of these autofocus systems, they are also subject to failure because of the moving parts. Moreover, traditional autofocus systems also generate some level of noise when focusing the lens, often making them undesirable for surveillance imaging systems where a low profile is advantageous. Reducing the cost and complexity of variable focus lenses, as well as improving their performance, may increase the applications for which variable focus lenses are suitable.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

Figure 1:
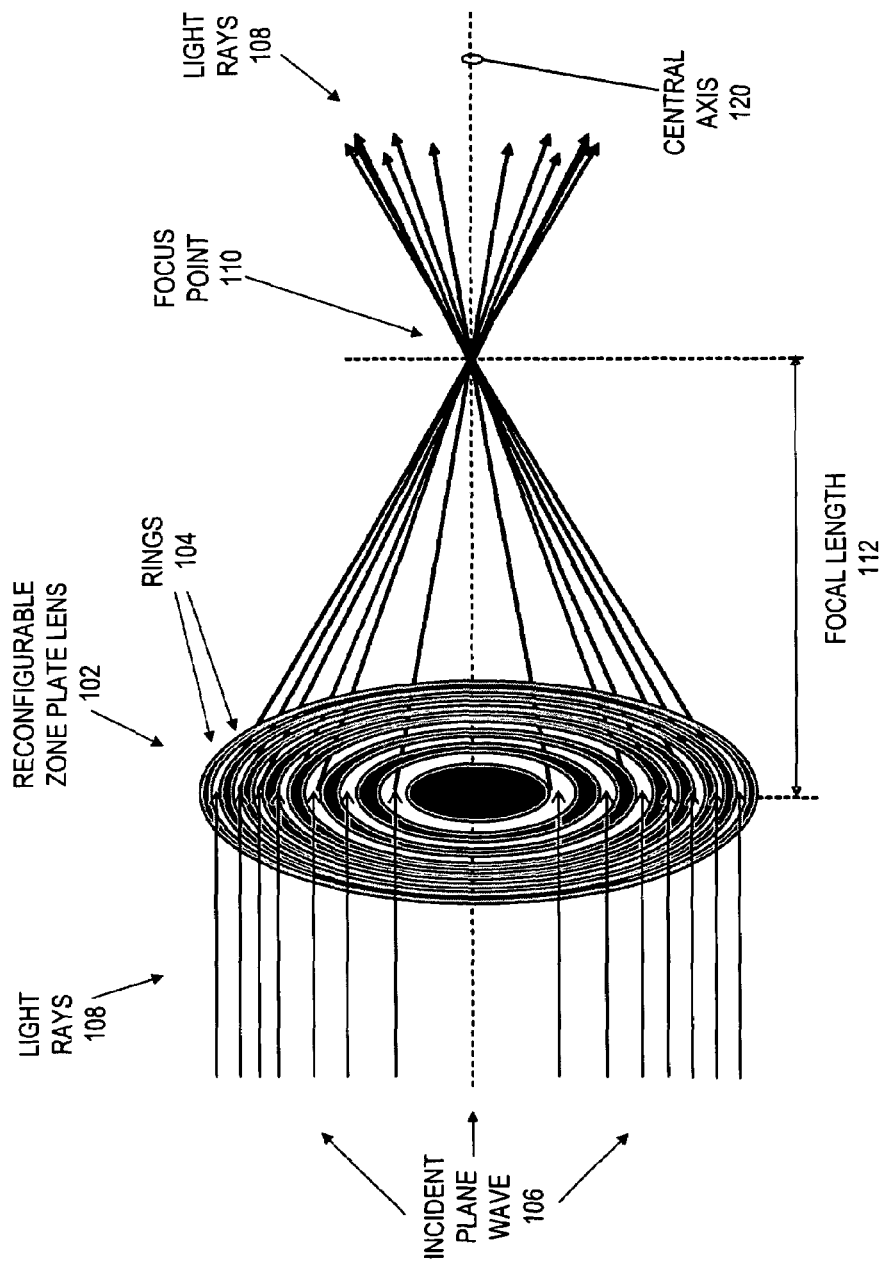
FIG. 1 depicts an isometric side view of a reconfigurable zone plate lens according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, a reconfigurable zone plate lens with variable focus is disclosed. Some embodiments may include a central annular element having a first a first circumference centered about a central axis. Embodiments may also include a plurality of concentric annular elements of increasing circumference centered about the central axis and the central annular element, where each annular element is positioned around an annular element having a smaller circumference. The annular elements of some embodiments may each be adapted to be in either an active state or an inactive state where the active and inactive annular elements form a plurality of alternating active rings and inactive rings. Each active ring may include one or more annular elements in an active state and each inactive ring may include one or more annular elements in an inactive state. In a further embodiment, each annular element may include one or more liquid crystal display (LCD) elements or one or more micromirrors. The reconfigurable zone plate lens may be utilized in an imaging system such as a variable focus camera, a variable focus projector, or any other system.

Another embodiment comprises a method for focusing a reconfigurable zone plate lens having a plurality of annular elements. Embodiments of the method may include configuring the reconfigurable zone plate lens to a first focus point by modifying the activation state of one or more of the plurality of annular elements to form a plurality of alternating active rings and inactive rings. Embodiments of the method may also include determining a new, different focus point and a new ring setting of active rings and inactive rings associated with the new focus point. Embodiments may also include reconfiguring the reconfigurable zone plate lens based on the new ring setting by modifying the activation state of one or more annular elements to form new alternating active rings and inactive rings.

The disclosed system and methodology may advantageously provide for a reconfigurable zone plate lens with a plurality of annular elements that has variable focus ability. The annular elements may each include one or more LCD elements or, alternatively, one or more micromirrors. By modifying the state of the annular elements between active and inactive states to form different active and inactive rings, the focus point of the zone plate lens may be advantageously controlled by modifying the state of the annular elements. The reconfigurable zone plate lens may accordingly be used as a variable focus lens for many applications. Some embodiments of the reconfigurable zone plate lens may be lower power, lower cost, quieter, or smaller in size when compared with traditional glass lenses, making the reconfigurable zone plate lens attractive for applications such as surveillance video cameras, webcams or mobile phone cameras, projection systems, or any other systems.

Various embodiments of the present invention provide systems and methods for reconfiguring a zone plate lens. The following description provides specific details of certain embodiments of the invention illustrated in the drawings to provide a thorough understanding of those embodiments. It should be recognized, however, that the present invention can be reflected in additional embodiments and may be practiced without some of the details in the following description. In other instances, well-known structures and functions have not been shown or described in detail to avoid unnecessarily obscuring the description of the embodiments of the invention. While specific embodiments will be described below with reference to particular configurations and systems, those of skill in the art will realize that embodiments of the present invention may advantageously be implemented with other substantially equivalent configurations and/or systems.

Turning now to the drawings, FIG. 1 depicts an isometric side view of a reconfigurable zone plate lens according to some embodiments. The reconfigurable zone plate lens 102 may include a plurality of concentric rings 104 centered about a central axis 120. A zone plate lens, also known as Fresnel zone plate lens, is known in the art and is a device used to focus light. Unlike optical lenses, however, a zone plate lens utilizes diffraction instead of refraction. A traditional zone plate lens includes a plurality of radially symmetric rings around a central disk in which the rings alternate between opaque and transparent. The radially symmetric rings may also be known as Fresnel zones or zones. Light hitting the zone plate diffracts around the opaque zones, which may be spaced so that the diffracted light constructively interferes at the desired focus point, creating an image at that point. The appropriate size and number of rings in a traditional zone plate lens may depend on a number of factors, including the wavelength of light, the focal length, and the distance to the object to be imaged. The reconfigurable zone plate lens 102 of the disclosed embodiments provides for dynamically modifying the number and/or size of the rings 104 to change the point of focus of the reconfigurable zone plate lens 102 and to thus provide for a variable focus lens. As will be described in more detail subsequently, the reconfigurable zone plate lens 102 may be comprised of a plurality of annular elements (each constructed of LCD elements or other elements) that may each be made active or inactive. Groups of one or more annular elements may dynamically form different numbers and sizes of rings 104, providing for the flexible ring 104 arrangement and thus variable focus.

In the depicted embodiment, the reconfigurable zone plate lens 102 is receiving light rays 108 in the form of an incident plane wave 106. An incident plane wave 106 may represent an imaged object that is an 'infinite' distance away. For purposes of this discussion, an infinite distance represents a distance sufficiently far for the light rays 108 to be substantially evenly distributed in an incident plane wave 106 instead of appearing as a point source. The light rays 108 pass through the reconfigurable zone plate lens 102 and diffract to a focus point 110. The distance between the plane of the reconfigurable zone plate lens 102 and the focus point 110 is the focal length 112 of the reconfigurable zone plate lens 102.

Figure 2:
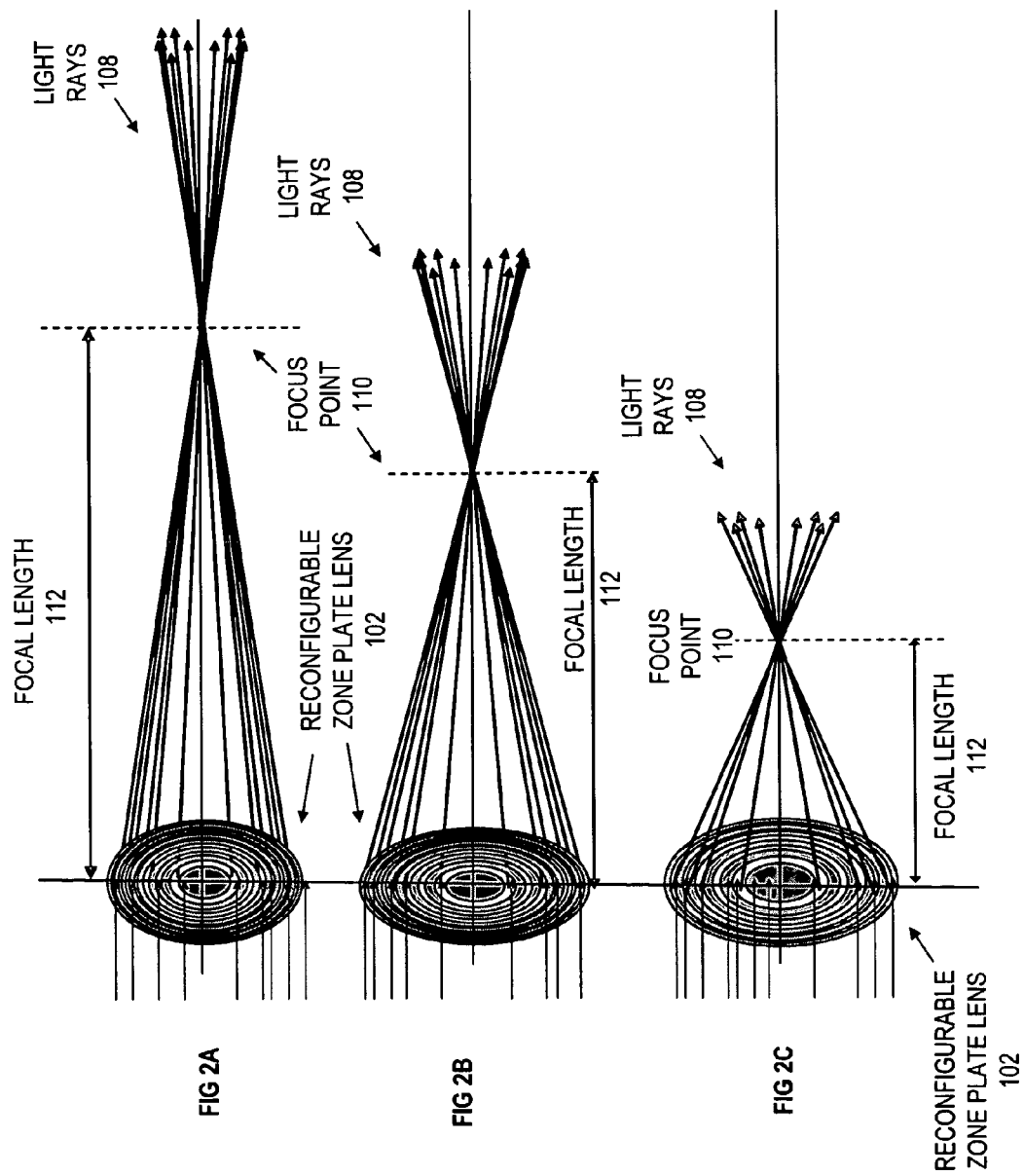
FIGS. 2A-2C depict isometric side views of embodiments of the reconfigurable zone plate lens of FIG. 1 with different ring configurations.

FIGS. 2A, 2B, and 2C depict isometric side views of embodiments of the reconfigurable zone plate lens of FIG. 1 with different ring configurations. In FIGS. 2A, 2B, and 2C, the change in focal length 112 as the configuration of the rings 104 of the reconfigurable zone plate lenses 102 is depicted. In FIG. 2A, the reconfigurable zone plate lens 102 has a relatively dense pattern of rings 104 formed by active and inactive annular elements, resulting in a relatively long focal length 112. The dense pattern of rings 104 may be the result of more rings 104 and/or rings 104 with smaller widths as created by the pattern of active and inactive annular elements. In FIG. 2B, on the other hand, the reconfigurable zone plate lens 102 has both larger rings and fewer rings 104 than that of FIG. 2A, resulting in a shorter focal length 112. Similarly, the reconfigurable zone plate lens 102 of FIG. 2C has even larger rings 104 and a smaller number of rings 104, resulting in a shorter focal length 112 than the reconfigurable zone plate lenses 102 of FIGS. 2A and 2B. As depicted in FIGS. 2A, 2B, and 2C, the configuration (i.e., the ring setting) of the reconfigurable zone plate lens 102 may change the focal length 112 of the lens, providing flexibility in the design and operation of the reconfigurable zone plate lens 102.

Figure 3:
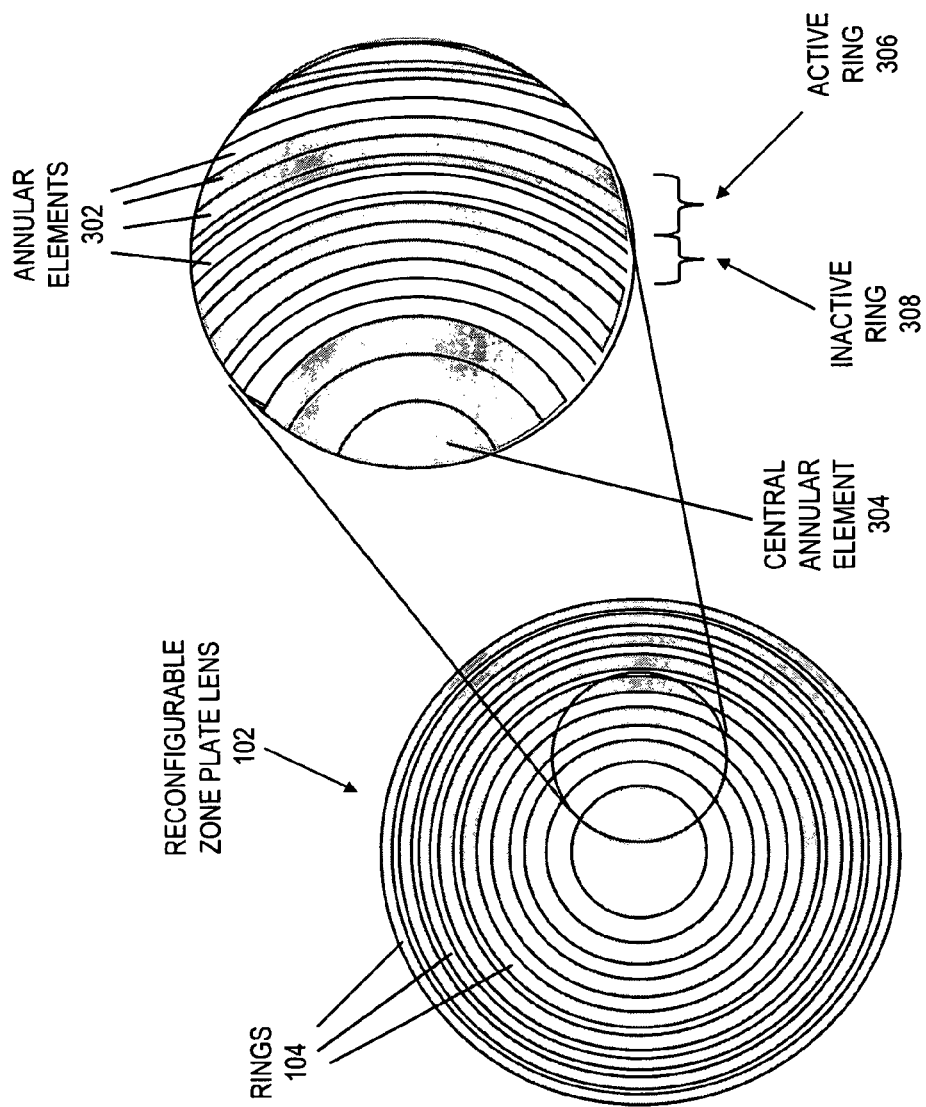
FIG. 3 depicts a front view of a reconfigurable zone plate lens with an exploded view of the annular elements according to some embodiments.

FIG. 3 depicts a front view of a reconfigurable zone plate lens with an exploded view of the annular elements according to some embodiments. The reconfigurable zone plate lens 102 of FIG. 3 includes a plurality of concentric rings 104. As can be seen in the exploded view, the rings 104 of the depicted reconfigurable zone plate lens 102 are each comprised of a plurality of concentric annular elements 302 of increasing circumference, where each annular element 302 is positioned around the annular element 302 inside of it that has a smaller circumference. A central annular element 304 may serve as the center of the reconfigurable zone plate lens 102 and as the innermost of the annular elements 302. In some embodiments, the central annular element 304 may be a disk having a first, outer circumference. In some embodiments, the annular elements 302 may be circular having an inner circumference and an outer circumference and may be centered about a central axis. For annular elements 302 besides the outermost and innermost ones, the inner circumference of the annular element 302 may be positioned adjacent the outer circumference of a smaller annular element 302, while the outer circumference of the annular element 302 may be positioned adjacent the inner circumference of a larger annular element 302.

As will be described in more detail subsequently, each annular element 302 (including central annular element 304) may be either in an active state (depicted as white in FIG. 3) or an inactive state (depicted as gray in FIG. 3). Groups of one or more active annular elements 302 may form an active ring 306 and groups of one or more inactive annular elements 302 may form an inactive ring 308. The central annular element 304 may form a ring 104 with one or more other annular elements 302 or may serve as a ring 104 on its own. For reconfigurable zone plate lens 102, the active rings 306 and inactive rings 308 alternate to create the Fresnel zone plate effect when light passes through. Each active ring 306 may accordingly include one or more adjacent active annular elements 302 while each inactive ring 308 may include one or more adjacent inactive annular elements 302. The number and width of each annular element 302 in a particular ring 104 determines its thickness. As the central annular element 304 may be either active or inactive, the alternating inactive and active rings 104 may start with either an active or inactive state.

The annular elements 302 in some embodiments may be liquid crystal display (LCD) elements and may optionally be attached to adjacent annular elements 302. LCD technology is known in the art. The LCD annular elements 302 may, in some embodiments, be circular rather than constructed from a grid-type matrix. Circular LCD annular elements 302 have smoother edges than a grid-type matrix elements and are thus optically beneficial since light will not be lost through diffraction at rectangular artifacts. For circular annular elements 302, the shape of the Fresnel zone is made by the shape of the annular elements 302 themselves and accordingly results in substantially smooth edges through which light passes. Circular annular elements 302 may also reduce addressing complexity as there will be fewer circular elements than there will be elements in a reasonable grid-type matrix. A grid-type matrix with a very dense pixel array may produce satisfactory optical performance at the cost of increased price, addressing complexity, and power consumption. A very fine pixel array may also allow for distortions to be made in the zone plate pattern to allow corrections, such as for keystone or pincushion distortion for reconfigurable zone element lens 102 used in a projector display. Such a very fine pixel array, however, would result in increased cost, power consumption, and addressing complexity. In another alternative embodiment, each annular element 302 may include two or more LCD elements, such as an LCD annular element 302 with two semi-circular LCD elements.

The LCD annular elements 302 may utilize an LCD intensity mode to generate inactive and active rings 104. In LCD intensity mode, each element of the liquid crystal display includes liquid crystal molecules with electric charges suspended between two transparent electrodes and two polarizing filters with perpendicular axes of polarity. Without the liquid crystals between them, light passing through one polarizer would be blocked by the other. The liquid crystal when active twists the polarization of light entering one filter to allow it to pass through the other. The liquid crystals may be activated by applying a small electrical charge to transparent electrodes for each element, which changes the twist of light passing through the molecules when interacting with the electric charges on the liquid crystals. Before the electrical charge is applied, the liquid crystal molecules are in a relaxed and twisted state that rotates the light passing through so that it may exit through the second polarizing filter. This corresponds to the active state associated with active annular elements 302 in an active ring 306. Because light is passing through polarizing filters, its intensity is reduced even for this active state. When the electrical charge is applied to the LCD element, the molecules of the liquid crystal align themselves parallel to the electric field, reducing the twist of the liquid crystals and thus eliminating the light passing through the element. This state corresponds to the passive state associated with the inactive annular elements 302 in an inactive ring 308.

The LCD annular elements 302 may alternatively use an LCD phase-shift mode to generate inactive and active rings 104. In the phase-shift mode, different phase shifts are given to the light in the active elements than the inactive elements. Different phase shifts are achieved by providing different refractive indexes to annular element 302 in different states, which may be accomplished via LCD technology. Adjacent rings 104 (or zones) thus have annular elements 302 with different refractive indexes. When compared to the intensity mode, the phase-shift mode provides an advantage of reduced transmissive losses as the light passes freely through both the active elements and the inactive elements, instead of having some polarizer losses in the active element of the intensity mode and the total losses from the opaque, inactive elements. One of ordinary skill in the art will recognize that other LCD alternatives are possible, including but not limited to those that provide sufficient amounts of contrast between active and inactive elements while minimizing transmissive losses. In an alternative embodiment, the reconfigurable zone plate lens 102 may be implemented in a Liquid Crystal on Silicon (LCOS). This embodiment, as described in more detail in relation to FIG. 6, may be used in projection applications as the reconfigurable zone plate lens 102 reflects light hitting the lens instead of passing some of the light through.

In an alternative embodiment, annular elements 302 may include one or more micromirrors instead of LCD elements. Micromirrors are tiny mirrors which react differently to light depending on their tilt, or orientation. Light hitting an active micromirror will reflect through while light hitting an inactive micromirror will reflect to a light absorber. Micromirrors are typically included within a digital micromirror devices (DMDs), which are semiconductor chips that may have thousands or millions of micromirrors positioned on them. An example DMD is a Digital Light Processing (DLP®) chip from Texas Instruments, Inc. Micromirrors and DMDs may serve as light modulating devices that manipulate light differently depending on their configuration (as determined by the application or removal of an electric charge). In some embodiments, annular elements 302 constructed from a plurality of micromirrors may be used for a zone plate lens 102 suitable for use with focusing X-rays, soft X-rays, or Extreme ultra-violet (EUV) radiation in applications such as lithography, X-ray telescopes, X-ray projectors, or X-ray-based medical imaging devices. Micromirrors in these embodiments may be coated with a material that reflects X-rays, soft X-rays, or EUV, such as ruthenium or gold coatings. Multilayer coatings of Ruthinium and Silicon (Ru/Si) may also be used to increase the reflectivity of the micromirrors. Micromirrors annular elements 302 are described in more detail in relation to FIG. 7.

Figure 4:
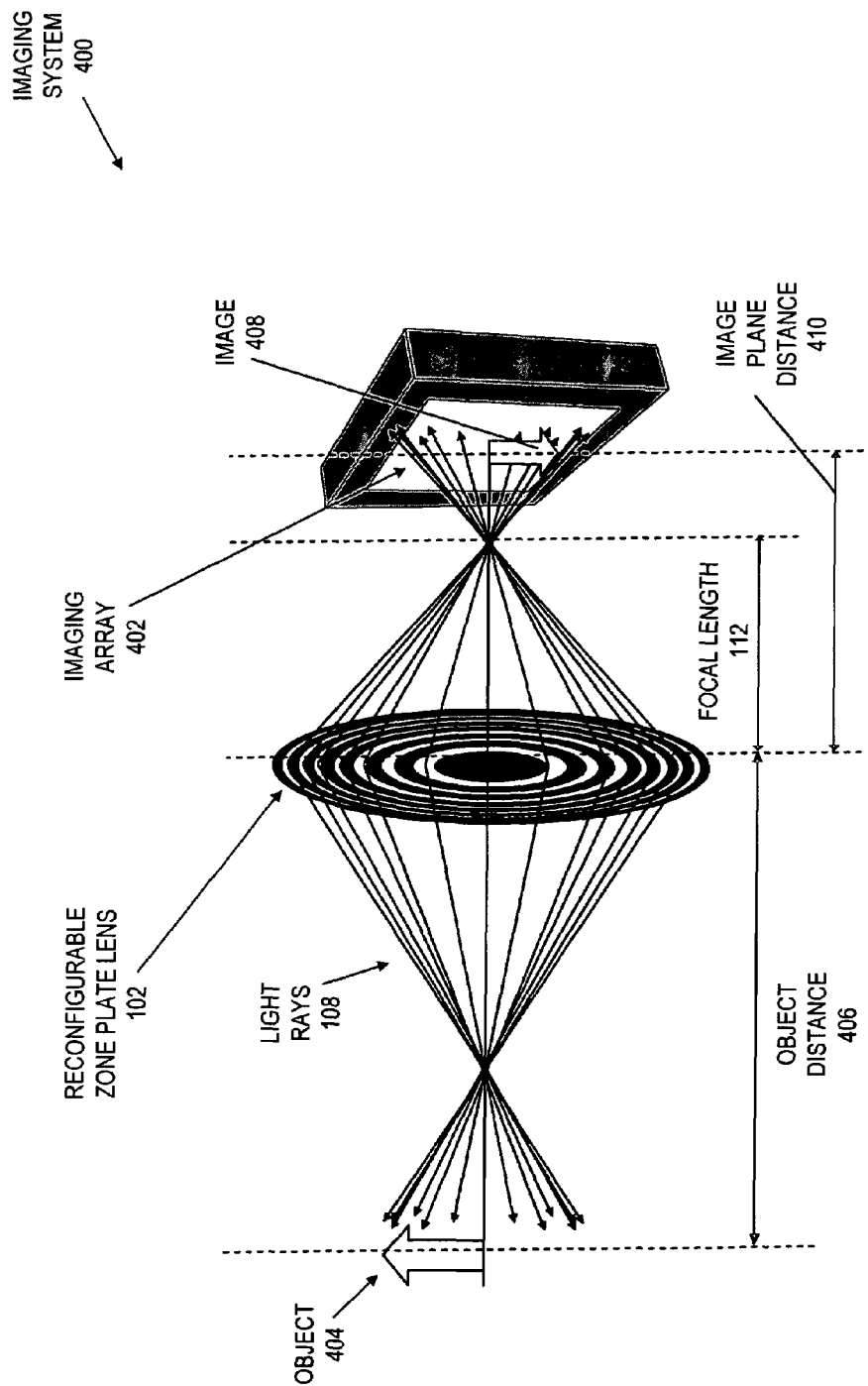
FIG. 4 depicts an isometric side view of an imaging system including a reconfigurable zone plate lens and imaging array according to some embodiments.

FIG. 4 depicts an isometric side view of an imaging system 400 including a reconfigurable zone plate lens 102 and an imaging array 402 according to some embodiments. In imaging system 400, light rays 108 pass from the object 404 to be imaged through the reconfigurable zone plate lens 102 and are then directed to the imaging array 402. The image 408 formed on imaging array 402 is upside down relative to object 404 in the depicted embodiment. Imaging array 402 may be any type of optical sensor that may capture an indication of an image 408, such as a charge-coupled device (CCD) sensor, complementary metal-oxide-semiconductor (CMOS) sensor, or other type of sensor. Alternatively, imaging system 400 may use film at the image plane distance 410 instead of a digital imaging array 402.

The distance between the object 404 and the reconfigurable zone plate lens 102 is the object distance 406, the distance from the reconfigurable zone plate lens 102 to the focus point is the focal length 112, and the distance from the reconfigurable zone plate lens 102 to the imaging array 402 (or film) is the image plane distance 410. The focal length 112 of the lens 102 may be determined based on the size of the reconfigurable zone plate lens 102 and the desired wavelength of light. The imaging system 400 may thus advantageously be tuned for particular wavelengths, which may be particularly useful for monochrome patterns (such as those used for security surveillance systems) as the lens may be tuned for the desired wavelength. A 'tuned' reconfigurable zone plate lens 102 allows substantially all of the light at the tuned wavelength to pass and thus offers significantly lower transmissive losses than glass lenses.

The reconfigurable zone plate lens 102 may focus on objects 404 at various object distances 406 by modifying the number and size of the rings 104. The proper ring setting may depend on both the focal length 112 and the object distance 406. As the object distance 406 changes, the desired ring setting for the reconfigurable zone plate lens 102 may thus change to focus on the object 404 at the new object distance 406. For a zone plate, the focal length 112, image plane distance 410, and object distance 406 at which focus is achieved are all interrelated. As the image plane distance 410 for an imaging system 400 may typically be fixed, the focal length 112 of the reconfigurable zone plate lens 102 may be changed to modify the object distance 406 at which focus is achieved. By modifying the number and size of rings 104 of the reconfigurable zone plate lens 102 (as described in relation to FIGS. 2A-2C), its focal length 112 may be changed to result in the correct object distance 406 for proper focus.

Figure 5:
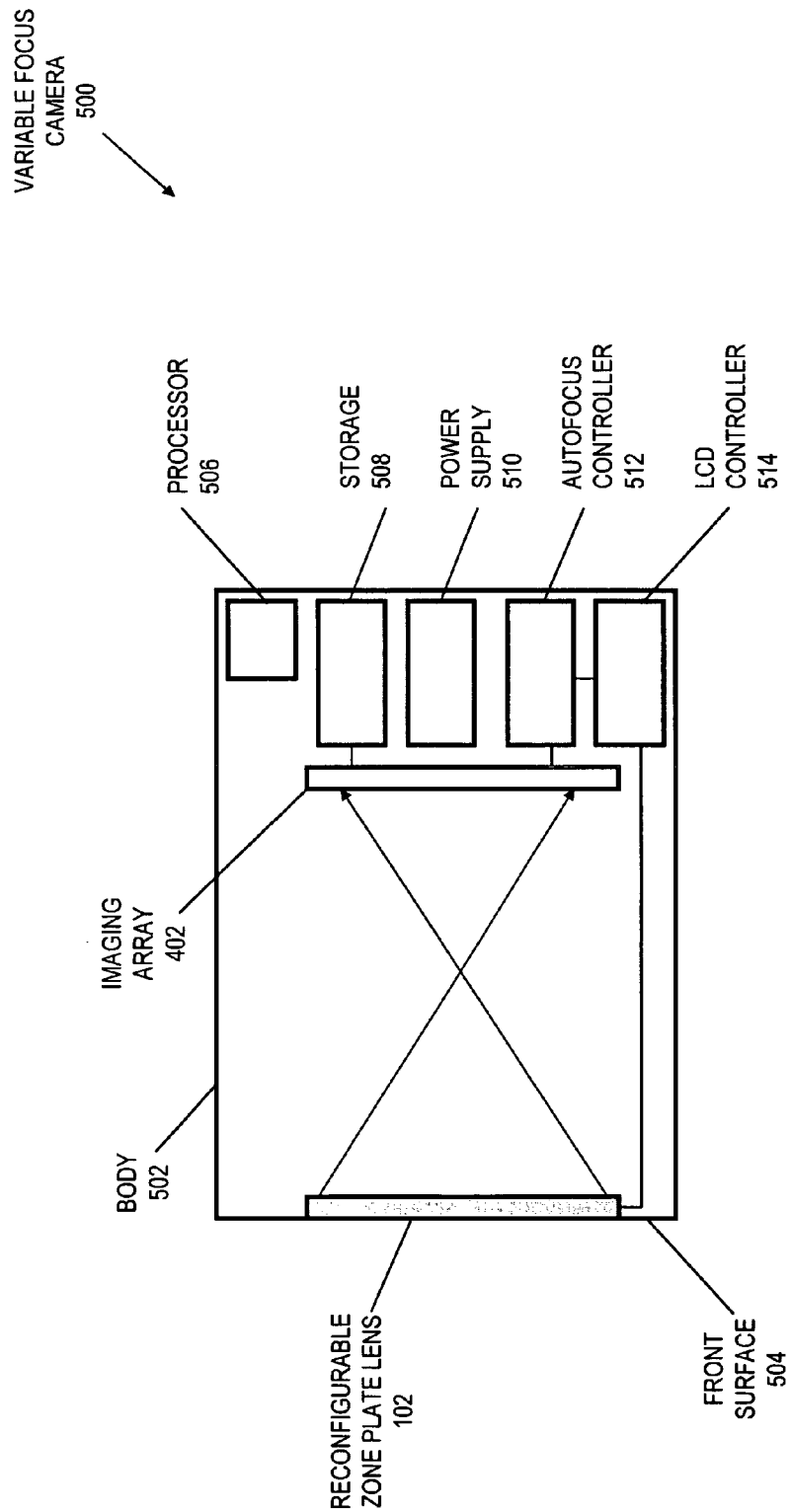
FIG. 5 depicts a side cut-away view of a variable focus camera with a reconfigurable zone plate lens according to some embodiments.

FIG. 5 depicts a side cut-away view of a variable focus camera 500 with a reconfigurable zone plate lens 102 according to some embodiments. The variable focus camera 500 of FIG. 5 may be an application of the imaging system 400 of FIG. 4. Variable focus camera 500 may be a still camera (e.g., DSLR, film SLR, mobile phone camera, etc.) or a video camera (e.g., webcam, surveillance camera, etc.). The variable focus camera 500 may include a body 502 having and substantially enclosing a body cavity and having a front surface 504. A reconfigurable zone plate lens 102 may be positioned (e.g., attached or mounted) in or on the front surface 504. Light reflected from an object to be photographed or recorded may enter body 502 through the reconfigurable zone plate lens 102 and be directed to an imaging array 402 located within the body 502. The reconfigurable zone plate lens 102 of FIG. 5 may have LCD annular elements 302 to form its rings 104.

The variable focus camera 500 may also include a processor 506, storage 508, a power supply 510, an autofocus controller 512, and an LCD controller 514. Processor 506 may include one or more system central processing units (CPUs) or processors to execute instructions. The processor 506 may optionally process (e.g., sharpen, color correct, etc.) an image captured by imaging array 402 and may store the image in storage 508. Processor 506 may be stored on memory (not shown), which may include read-only memory (ROM), random access memory (RAM), or other types of memory (or combinations thereof) containing a plurality of executable instructions which, when executed on processor 506, control the operation of the variable focus camera 500. Storage 508 may include storage devices for storing digital images captured by the digital camera 200, such as removable media such as a microdrive or flash media devices such as a Secure Digital (SD)™ card (as defined by the SD Card Association), a CompactFlash® (CF) card, or a Memory Stick. Storage 508 may also include non-removable media such as hard drives or on-board non-volatile memory. An optional power supply 510 such as a battery or connection to external power may power components of the variable focus camera 500.

The autofocus controller 512 may determine whether an image is in focus and may also determine an appropriate corrective action in the event the image is not properly in focus. The autofocus controller 512 may be part of an autofocus system and rely, in some embodiments, on active autofocus, passive autofocus, or a combination of the two, and may utilize one or more autofocus sensors within the field of view. Active autofocus systems measure the distance to the subject (using, for example, sound or infrared signals) and adjust focus of the optical system accordingly. Passive systems analyze the incoming image itself and may include phase detection systems and/or contrast measurement systems. Complicated autofocus systems with many sensors can add significant cost and complexity to a variable focus camera 500, as autofocus sensors are relatively expensive and more accurate sensors (e.g., horizontal and vertical capability) are more expensive still. The autofocus controller 512 may work with the LCD controller 514 to adjust the focus of the reconfigurable zone plate lens 102.

The LCD controller 514 may determine an appropriate ring setting based on inputs from the autofocus controller 512 and may then activate or inactivate particular annular elements 302 based on the determined ring setting. The LCD controller 514 may thus adjust the focus of the reconfigurable zone plate lens 102 based on different object distances, input from the autofocus controller 512, or other factors. The focusing performance of the variable focus camera 500 need not be extremely fast in some embodiments (one second or more to focus) as many applications, such as surveillance cameras, do not have a need for extremely quick focusing.

The systems and methods of the disclosed embodiments may provide an effective mechanism for varying the focus of a lens that may be particularly suitable for some applications. When compared to many traditional high performance glasses lenses, the reconfigurable zone plate lens 102 may be relatively inexpensive, quiet, low profile, and low power. By eliminating the need for focusing motors, the cost and noise profile of the variable focus camera 500 can be lowered. Less expensive, lower performance glass lenses typically lack the ability to change focus, reducing their usefulness for many applications.

One example application for a variable focus camera 500 with a reconfigurable zone plate lens 102 is for use as a surveillance video camera. For this application, the lower power consumption and quiet operation provide benefits in the placement and operation of the video camera, as the camera may be placed in more locations and be less intrusive or more difficult to detect. In this application, absolute image quality may be less important than performance characteristics such as power consumption or reliability, making a reconfigurable zone plate lens 102 particularly attractive. Another example application for a reconfigurable zone plate lens 102 would be used as a camera for a mobile phone. As mobile phone designers desire to minimize power consumption, space, and cost, the reconfigurable zone plate lens 102 may prove attractive. In particular, the reconfigurable zone plate lens 104 may provide a thinner lens than traditional glass lenses and yet also provide additional functionality by providing focusing ability.

Figure 6:
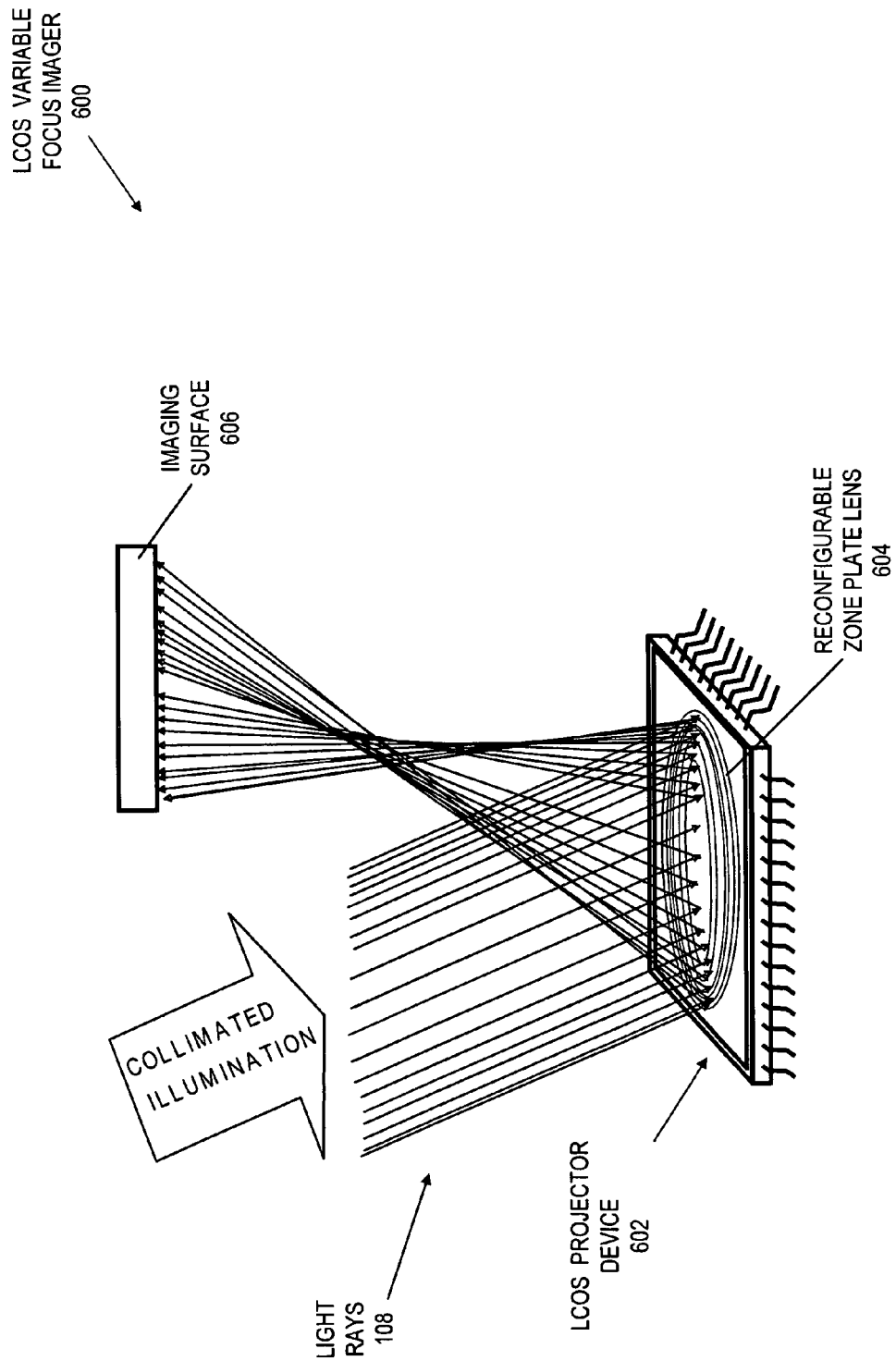
FIG. 6 depicts an isometric view of a LCOS variable focus imager with a reconfigurable zone plate lens according to some embodiments.

FIG. 6 depicts an isometric view of a LCOS variable focus imager with a reconfigurable zone plate lens according to some embodiments. The LCOS variable focus imager 600 may include an LCOS projector device 602, a reconfigurable zone plate lens 604, and an imaging surface 606. Liquid Crystal on Silicon (LCOS) devices utilize liquid crystal elements applied to a reflective mirror substrate. As the liquid crystals open and close (i.e., become active or inactive), light striking the device is either reflected from the mirror below or blocked. The LCOS projector device 602 may reflect light rays 108 striking its surface towards the imaging surface 606. The imaging surface 606 may be an imaging array (such as a digital CCD or CMOS sensor), a projection screen (for when LCOS variable focus imager 600 is a projector), or other surface.

The liquid crystals on the LCOS projector device 602 may be annular elements 302 as described in relation to FIG. 3 to form a reconfigurable zone plate lens 604 on the surface of the LCOS projector device 602. The reconfigurable zone plate lens 604 may adjust the point of focus so that the image displayed on the imaging surface 606 is properly focused. The LCOS variable focus imager 600 may utilize either a manual focus or autofocus system to focus the reconfigurable zone plate lens 604. Rather than a pixel matrix for the LCOS projector device 602, the concentric rings of the reconfigurable zone plate lens 604 may be selectively activated or deactivated to focus the incident light onto the imaging surface 606.

The LCOS variable focus imager 600 of FIG. 6 may be an application of the imaging system 400 of FIG. 4. In some embodiments, the LCOS variable focus imager 600 may be utilized as a still or video camera with the imaging surface 606 being a digital imaging array. The source image in these embodiments may be the object for which an image is desired to be made. In other embodiments, the LCOS variable focus imager 600 may be a projection device, such as a slide projector or movie projector. In these embodiments, the imaging surface 606 may be a projection screen or wall so that viewers may see the projected image. If the reconfigurable zone plate lens 604 in these embodiments comprises many fine LCD pixels instead of annular rings, the LCOS variable focus imager 600 may also optionally correct for distortion or keystoning in the projected image.

Figure 7:
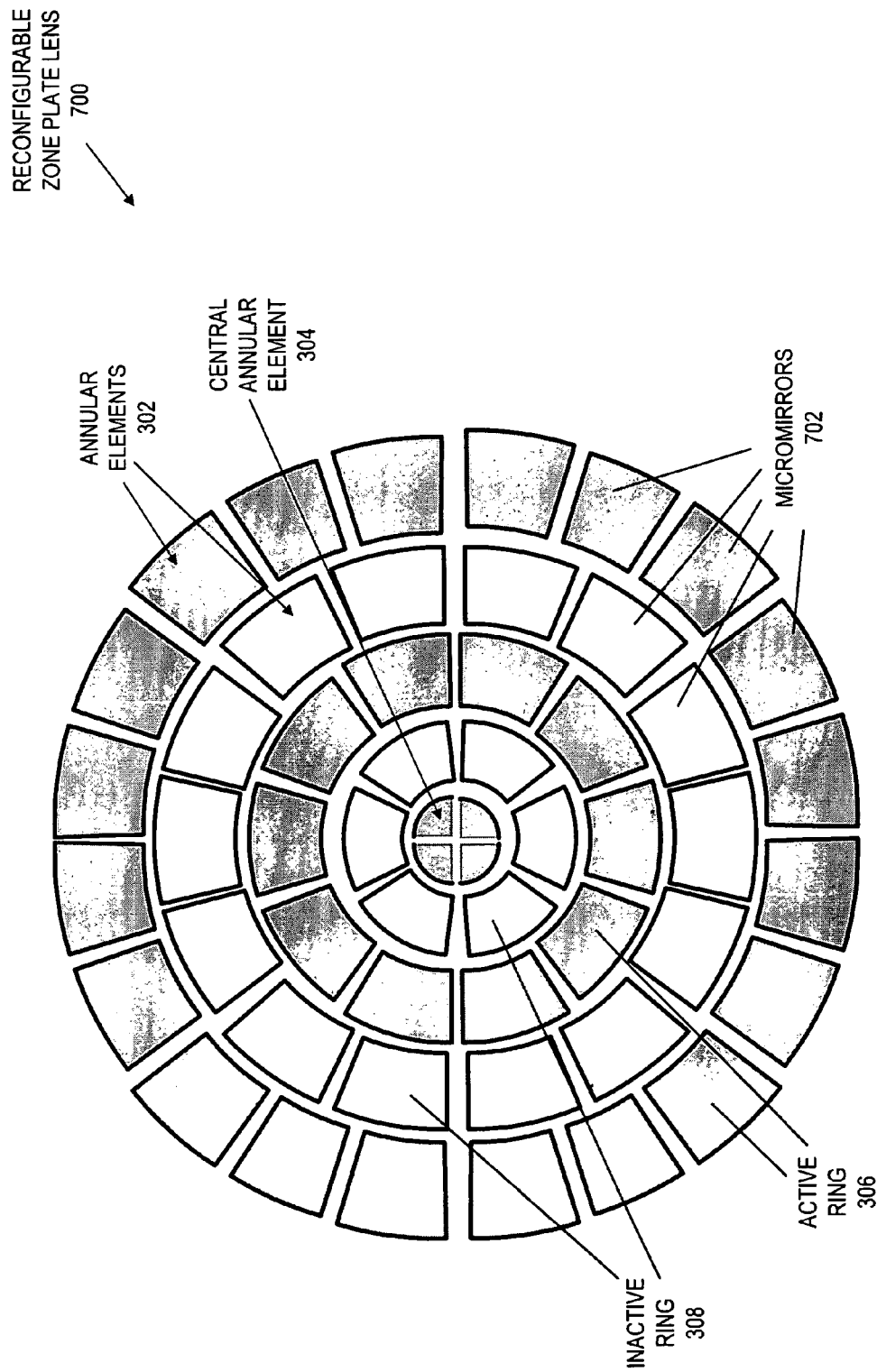
FIG. 7 depicts a front view of a zone plate lens with micromirror annular elements according to some embodiments.

FIG. 7 depicts a front view of a zone plate lens with micromirror annular elements according to some embodiments. The reconfigurable zone plate lens 700 of FIG. 7 includes a plurality of concentric, alternating active rings 306 and inactive rings 308 each composed of a plurality of micromirrors 702. The micromirrors 702 of FIG. 7 form a plurality of annular elements 302 and a central annular element 304. To form the annular elements 302, the micromirrors 702 may have a circular symmetry so that a plurality of micromirrors 702 form a rough ring with an inner and outer circumference. A higher number of micromirrors 702 in each ring results in more accurate rings with less edge effects and potentially better performance, but at the potential cost of more complexity and a higher price. The reconfigurable zone plate lens 700 may be used in a reflective application similar to that of FIG. 6 but with a larger angle of reflection to achieve grazing incidence reflection for the micromirrors 702. As described previously, the reconfigurable zone plate lens 700 with micromirrors 702 instead of LCD for the annular elements 302 may be particularly useful for focusing X-rays, soft X-rays, or EUV radiation.

Figure 8:
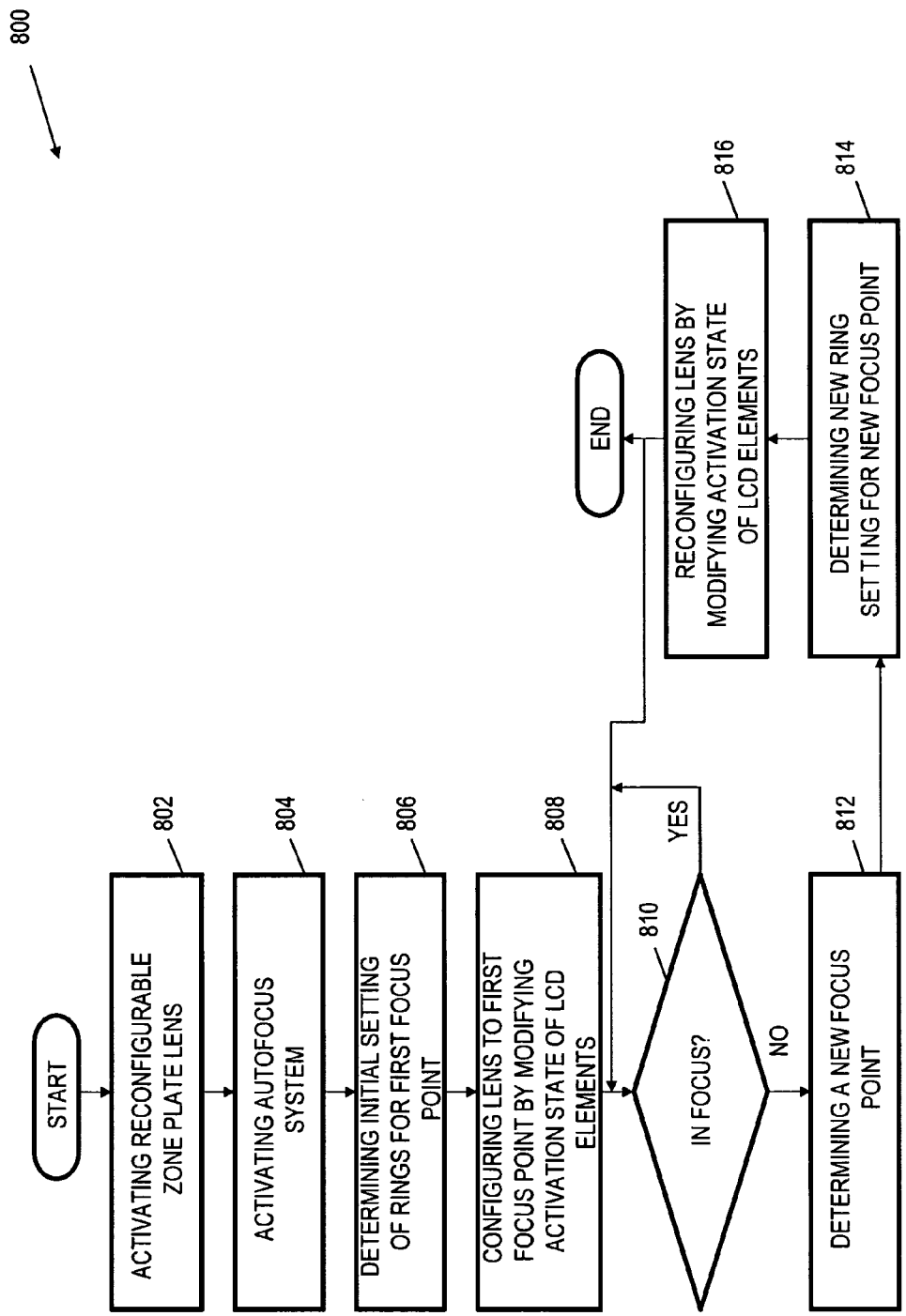
FIG. 8 depicts a flowchart to modify the focus of a reconfigurable zone plate lens according to some embodiments.

FIG. 8 depicts a flowchart to modify the focus of a reconfigurable zone plate lens according to some embodiments. In one embodiment, one or more components of an imaging system 400 (or variable focus camera 500), such as an autofocus controller 512 or LCD controller 514, may perform the elements of flowchart 800. In the depicted embodiment, flowchart 800 begins with element 802, activating a reconfigurable zone plate lens 104. At element 802, the imaging system 400, for example, may activate the reconfigurable zone plate lens 104 at startup, per user request, upon the occurrence of another condition (e.g., tripping of a motion sensor, etc.), or other event. At element 804, the imaging system 400 or other system may optionally activate the autofocus system, which may include an autofocus controller 512. Alternatively, the imaging system 400 may not have an autofocus system and a user may instead manually input focus commands. This embodiment may prove useful for low cost embodiments such as mobile phones or systems where the user may desire more control, such as a projector system.

Once the system is activated, the method of flow chart 800 continues to element 806, where the imaging system 400 may determine an initial setting of rings 104 for the reconfigurable zone plate lens 102 for a first focus point. The initial ring setting may be a default setting, the last ring setting during the last use of the imaging system 400, an initial attempt at focusing, or any other ring setting. A ring setting may include information such as a number of rings 104, which rings 104 may be active rings 306 or inactive rings 308, or the width of each ring 104. The imaging system 400 may then (through a LCD controller 514, for example) configure the reconfigurable zone plate lens 102 at element 808 to the first focus point by modifying the activation state of one or more annular elements 302 based on the ring setting. If, for example, the ring setting called for more, smaller rings the activation state of the annular elements 302 could be changed appropriately, leaving some annular elements 302 in the same state, inactivating some active annular elements 302, and activating some inactive annular elements 302. The particular annular elements 302 that need to be modified will be based on the previous ring setting, the new ring setting, the size of the annular elements 302, or other factors. As described previously, the annular elements 302 may be LCD elements, micromirrors, or other light modulating technology.

At decision block 810, the imaging system 400 may determine whether the image is in focus, such as determination of the autofocus controller 512, by implication if no user input to modify focus is received, or by other method. If the image is in focus (or no indication is received that the image is out of focus), the method of flow chart 800 returns to decision block 810 to wait for further input. If the focus will be changed, the method of flow chart 800 continues to element 812, determining a new focus point. In one embodiment, the autofocus controller 512 may determine a new focus point or ring configuration based on its algorithms. In other embodiments, a user may input an indication of a new focus point by requesting to move the focus point closer or further, such as by actuating focus change buttons in an imaging system 400. The imaging system 400 may next determine the new ring setting for the new, different focus point at element 814. The new ring setting may include information such as a number of rings 104, which rings 104 may be active rings 306 or inactive rings 308, or the width of each ring 104. The imaging system 400 may then (such as through a LCD controller 514) reconfigure the reconfigurable zone plate lens 102 at element 816 to the new focus point by modifying the activation state of one or more annular elements 302 based on the new ring setting. As at element 808, the imaging system 400 may change the annular elements 302 as appropriate for the new ring setting by leaving some annular elements 302 in the same state, inactivating other active annular elements 302, and activating other inactive annular elements 302. The particular annular elements 302 that need to be modified will be based on the previous ring setting, the new ring setting, the size of the annular elements 302, or other factors. After reconfiguring the reconfigurable zone plate lens 102, the method of flow chart 800 may either return to decision block 810 for additional refocusing or terminate.

While certain operations have been described herein relative to a direction such as "above" or "below" it will be understood that the descriptors are relative and that they may be reversed or otherwise changed if the relevant structure(s) were inverted or moved. Therefore, these terms are not intended to be limiting.

It will be apparent to those skilled in the art having the benefit of this disclosure that the present invention contemplates a reconfigurable zone plate lens with variable focus. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A reconfigurable zone plate lens comprising:
   a central annular element having a first circumference centered about a central axis;
   a plurality of concentric annular elements of increasing circumference centered about the central axis and the central annular element, each annular element being positioned around an annular element with a smaller circumference;
   wherein the annular elements each comprise one or more liquid crystal display (LCD) elements;
   wherein the annular elements are each adapted to be in either an active state or an inactive state, and wherein further the active and inactive annular elements form a plurality of alternating active rings and inactive rings, each active ring comprising one or more annular elements in an active state and each inactive ring comprising one or more annular elements in an inactive state; and
   wherein further the one or more LCD elements of each annular element have a first phase shift in their active state, a second, different phase shift in their inactive state, and are light transmissive in both their active and inactive states.

2. The zone plate lens of claim 1, wherein the central annular element is a disk having an outer circumference.

3. The zone plate lens of claim 1, wherein the central annular element is a circular element having an inner circumference and an outer circumference.

4. The zone plate lens of claim 1, wherein the plurality of concentric annular elements are circular elements, each having an inner circumference and an outer circumference.

5. An imaging system comprising:
   an imaging array; and
   a reconfigurable zone plate lens to direct light to the imaging array, the lens comprising:
   a central annular element having a first circumference centered about a central axis;
   a plurality of concentric annular elements of increasing circumference centered about the central axis and the central annular element, each annular element being positioned around an annular element with a smaller circumference, wherein the annular elements each comprise one or more liquid crystal display (LCD) elements;
   wherein the annular elements are each adapted to be in either an active state or an inactive state, and wherein further the active and inactive annular elements form a plurality of alternating active rings and inactive rings, each active ring comprising one or more annular elements in an active state and each inactive ring comprising one or more annular elements in an inactive state; and
   wherein further the one or more LCD elements of each annular element have a first phase shift in their active state, a second, different phase shift in their inactive state, and are light transmissive in both their active and inactive states.

6. The imaging system of claim 5, further comprising a body enclosing a body cavity and having a front surface, wherein the imaging array is positioned within the body and the zone plate lens is positioned on the front surface of the body.

7. The imaging system of claim 5, further comprising a processor positioned within the body to execute instructions to operate the imaging system.

8. The imaging system of claim 5, further comprising an autofocus controller to determine a focus point.

9. The imaging system of claim 5, further comprising a (LCD) controller to activate or deactivate annular rings.

* * * * *

UNITED STATES PATENT AND TRADEMARK OFFICE
CERTIFICATE OF CORRECTION

PATENT NO. : 7,420,737 B2 Page 1 of 1
APPLICATION NO. : 11/314602
DATED : September 2, 2008
INVENTOR(S) : Williams et al.

It is certified that error appears in the above-identified patent and that said Letters Patent is hereby corrected as shown below:

On the Title page item (57), under "Abstract", lines 2-3, after "a first" delete "a first".

In column 12, line 43, in Claim 9, delete "(LCD)" and insert -- LCD --, therefor.

Signed and Sealed this

Sixteenth Day of December, 2008

JON W. DUDAS
*Director of the United States Patent and Trademark Office*